(12) United States Patent
Singh et al.

(10) Patent No.: US 10,917,671 B2
(45) Date of Patent: Feb. 9, 2021

(54) ENHANCEMENT OF METADATA FOR ITEMS OF MEDIA CONTENT RECORDED BY A DIGITAL VIDEO RECORDER

(71) Applicant: Caavo Inc, Milpitas, CA (US)

(72) Inventors: Amrit P. Singh, Bangalore (IN);
Sravan K. Andavarapu, Jeypore (IN);
Vinod K. Gopinath, Bangalore (IN);
Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 16/258,077

(22) Filed: Jan. 25, 2019

(65) Prior Publication Data
US 2019/0238901 A1  Aug. 1, 2019

(30) Foreign Application Priority Data
Jan. 26, 2018 (IN) .............................. 201841003133

(51) Int. Cl.
| | |
|---|---|
| H04N 7/173 | (2011.01) |
| H04N 21/235 | (2011.01) |
| G06F 16/41 | (2019.01) |
| G06K 9/32 | (2006.01) |
| G06F 16/483 | (2019.01) |
| G06F 16/00 | (2019.01) |

(52) U.S. Cl.
CPC ......... *H04N 21/2353* (2013.01); *G06F 16/00* (2019.01); *G06F 16/41* (2019.01); *G06F 16/483* (2019.01); *G06K 9/325* (2013.01); *G06K 2209/27* (2013.01)

(58) Field of Classification Search
CPC ... H04N 21/2353; G06F 16/483; G06F 16/41; G06F 16/00; G06K 9/325
See application file for complete search history.

(56) References Cited

U.S. PATENT DOCUMENTS

| | | | | |
|---|---|---|---|---|
| 2008/0260346 A1* | 10/2008 | Sukeda | .................. | H04H 60/73 386/241 |
| 2010/0169369 A1* | 7/2010 | Wang | ...................... | G06F 16/48 707/770 |
| 2014/0101706 A1* | 4/2014 | Kardatzke | .......... | H04N 21/4334 725/86 |

* cited by examiner

*Primary Examiner* — Mulugeta Mengesha
(74) *Attorney, Agent, or Firm* — Fiala & Weaver P.L.L.C.

(57) ABSTRACT

Methods, systems, and apparatuses are described herein for enhancing metadata of a recorded items of media content stored on a digital video recorder (DVR) associated with an end user. First metadata associated with the recorded item is determined from the DVR. An aired instance of the first media content is determined in program data from an electronic program guide that corresponds to the recorded item. Second metadata associated with the first media content is retrieved from at least one data source based at least on the identifying information. The first metadata and the second metadata are stored in an end user database in association with the end user.

20 Claims, 6 Drawing Sheets

ENHANCEMENT OF METADATA FOR ITEMS OF MEDIA CONTENT RECORDED BY A DIGITAL VIDEO RECORDER

CROSS-REFERENCE TO RELATED APPLICATIONS

This application claims priority to India Provisional Patent Application No. 201841003133, filed Jan. 26, 2018 and entitled "Enhancement of Metadata for Recorded Content," the entirety of which is incorporated by reference herein.

BACKGROUND

Technical Field

The subject matter described herein relates to the enhancing metadata for recorded items of media content stored on a digital video recorder.

Description of Related Art

A digital video recorder (DVR) is a consumer electronic device that records video in a digital format on a mass storage device. For instance, a DVR may include a set-top box, a portable media player, or a TV gateway with recording capability. Typically, a viewer causes items of media content to be recorded onto a DVR from linear television (TV), including from real-time TV services that broadcast scheduled programs conventionally over the air or through satellite or cable. For instance, a viewer may be looking forward to watching an item of media content broadcast at a time the viewer is not available to watch the broadcast live. Thus, by recording and storing the item of media content using the DVR, the viewer can access and play the item of media content at a later time. A limited amount of data descriptive of an item of media content may be stored with the item of media content on the DVR.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for enhancing metadata of recorded items of media content stored on a digital video recorder associated with an end user. A metadata determiner is configured to determine, from the digital video recorder, first metadata associated with a recorded item of first media content stored on the digital video recorder and including listed information for the recorded item. A program data retriever is configured to retrieve program data from an electronic program guide based on the listed information. A recorded item identifier is configured to determine, in the program data, an aired instance of the first media content that corresponds to the recorded item, where the aired instance of the first media content in the program data includes identifying information for the first media content additional to the listed information. A metadata enhancer is configured to retrieve second metadata associated with the first media content from at least one data source based at least on the identifying information. The second metadata includes supplemental information for the first media content additional to the listed information and the identifying information. The metadata enhancer is configured to store the first metadata and the second metadata in an end user database in association with the end user.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

II. Example Embodiments

The example embodiments described herein are provided for illustrative purposes, and are not limiting. The examples described herein may be adapted to any type of metadata enhancement system. Further structural and operational embodiments, including modifications/alterations, will become apparent to persons skilled in the relevant art(s) from the teachings herein.

DVRs are consumer electronic devices that record items of media content in a digital format such that users may access and play back a recorded item at a later time. Users typically utilize DVRs with respect to linear TV because users may want to watch items of media content at their leisure instead of at the original airing time. While there are many consumer electronic devices that accomplish the task of recording and storing items of media content for playback, these recorded items typically have limited descriptive information associated therewith. Thus, when the recorded items are presented to a user for playback, it can be difficult for the user to identify which item they wish to playback.

Furthermore, tools exist that utilize items of media content recorded and watched by users to perform user specific modeling to aid in providing user-specific searching and recommendations. However, due to the limited information associated with such recorded items, such tools may not be able to fully incorporate the recorded items in the user specific modeling.

Embodiments overcome these and other issues by intelligently and efficiently enriching or enhancing metadata for recorded items of media content stored on a DVR. In an embodiment, a media content metadata enhancing system communicates with a switching device via one or more networks. The media content metadata enhancing system remotely accesses recorded items stored on the DVR either directly or via the switching device. In embodiments, and to aid in the identification of the stored recorded items, the media content metadata enhancing system remotely accesses an Electronic Program Guide (EPG) stored on a set top box coupled to the DVR. Once the recorded item is identified, the media content metadata enhancing system retrieves second metadata associated with the recorded item from a content database. The second metadata is stored in an end user database specific to the end user. In this way, when the recorded item of media content is displayed to the end user, the second metadata may be displayed as an enhancement to any metadata already associated with the recorded item, providing an enhanced description of the recorded item. Furthermore, the recorded item of media content with enhanced description is more useful in during searching and user modeling.

Figure 1:
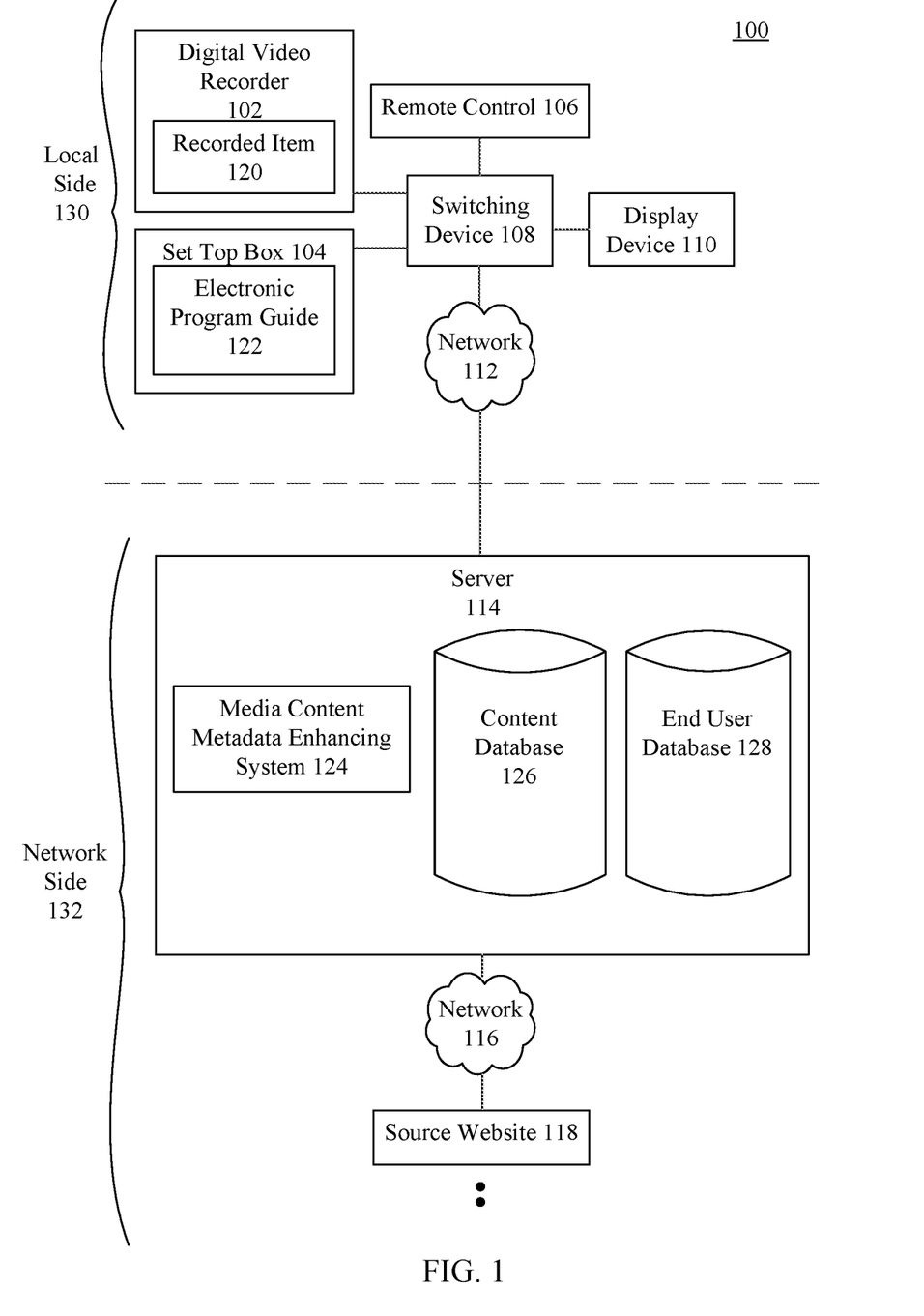
FIG. 1 depicts a block diagram of a system for enhancing metadata for recorded items of media content, according to an embodiment.

Example embodiments are described as follows that are directed to techniques for enhancing metadata for recorded items of media content. For instance, FIG. 1 depicts a block diagram of a system 100 for enhancing metadata for recorded items of media content, according to an embodiment. As shown in FIG. 1, system 100 includes a local side 130 and a network side 132. Local side 130 represents a user environment (e.g., a home, a room of a home, an office, etc.) and includes a digital video recorder (DVR) 102, a set top box 104, a remote control 106, a switching device 108, and a display device 110. DVR 102 stores a recorded item 120. Set top box 104 includes an electronic program guide (EPG) 122. Network side 132 represents a network-based environment (e.g., in a server, a server set, a data center, etc.) that is remote to local side 130, and is communicatively coupled with local side 130 over network 112. Network side 132 includes a server 114 and a source website 118, which are communicatively coupled via a network 116. Server 114 includes a media content metadata enhancing system 124, a content database 126, and an end user database 128. These features of system 100 are described as follows.

In the environment of local side 130, the components shown in FIG. 1 are physically close enough together to be connected via wired connections such as HDMI (high definition media interface) cables, coaxial cables, ethernet cables, and/or any other type of suitable wired media connection. However, it is important to note that this is not to be construed in a limiting sense and the components in local side 130 may be additionally and/or alternatively connected in their local environment via one or more wireless connections (e.g., personal area networks (PANs), wireless local area networks (WLANs).

Digital video recorder (DVR) 102 may be any consumer electronic device capable of recording items of media content in a digital format such that users may access, play, and watch the recorded item at a later time. Set top box 104 may be any consumer electronic device that receives a stream of media content that includes one or more of cable TV, satellite TV, and/or over-the-air TV and provides selected media content of the stream to a display device, such as display device 110, for viewing by the user. For example, set top box 104 may receive the stream in the form of a signal over an Ethernet cable, a satellite dish, a coaxial cable, a telephone line, a TV antenna, etc. Display device 110 may represent any display device, such as a television (TV) set (including a high definition television (HDTV), capable of displaying media content to users.

Switching device 108 may represent any device that may connect to and control entertainment devices, such as cable/satellite, streaming media players, and gaming consoles. In an embodiment, switching device 108 includes any type of media device hub, such as a multimedia switching device, an AVR, a repeater, or any other device that may comprise a media device hub or may operate as a hub for media devices or other devices. For instance, a media device hub as used herein may include a plurality of input and/or output AV ports and be operable to select an appropriate input and/or output port based on a selection (e.g., a user selection). An example of switching device 104 that may implement, or be adapted to implement, techniques described herein include, but is not limited to Control Center®, available from Caavo Inc. As shown in FIG. 1, switching device 108 may be coupled in a wired and/or wireless fashion to DVR 102, set top box 104, and display device 110.

Note that in an embodiment, DVR 102 and set-top box 104 may be physically separate devices as shown in FIG. 1. Alternatively, DVR 102 and set-top box 104 may be physically integrated in a single device.

In an embodiment, switching device 108 comprises an HDMI switching device such as that described in commonly-owned U.S. patent application Ser. No. 14/945,125, filed Nov. 18, 2015, and entitled "Automatic Identification and Mapping of Consumer Electronic Devices to Ports on an HDMI Switch", the entirety of which is incorporated by reference herein. In accordance with such an embodiment, the HDMI switching device is connected to a TV or other display device, such as display device 110, and provides a user interface through such display device by which a user can identify and replay recorded items of media content.

Remote control 106 may represent any component of an electronic device used to operate a device. Examples of remote control 106 include television remote controls, universal remotes, smart phones, tablet devices, and other devices that can be held in a person's hand or hands as well as stationary devices such as televisions, set-top boxes, satellite TV receiver boxes, DVD players, and other devices too large to be easily carried by a human, and that are intended to operate in a stationary location. In embodiments, remote control 106 may be configured to control switching device 108 which may be configured to control DVR 102 and set top box 104 for display to display device 110. However, this is not to be construed in a limiting sense and system 100 may include multiple remote controls to controls each of DVR 102, set top box 104, switching device 108, and display device 110.

Recorded item 120 represents an item of media content that is recorded by a user on local side 130 and stored on DVR 102. For example, recorded item 120 may be a recording of a television show, a movie, etc. As noted above, recorded item 120 includes metadata with listed information that describes the recorded item. For instance, the listed information may include information such as a title of the recorded item of media content, a recording time of the recorded item of media content, a recording duration of the recorded item of media content, an airing channel of the recorded item of media content, an episode title of the recorded item of media content, a recording video property of the recorded item of media content like HDMI, audio, etc., or the like. The metadata is typically exposed by the DVR for viewers to consume and is not necessarily uniform across different recording device types. As such, in embodiments, the metadata may need to be normalized or enriched to be processed for obtaining additional metadata that corresponds to the recorded item, discussed in greater detail hereinafter. The metadata may be enriched or normalized using various tools, such as, an EPG.

EPG 122 may represent a historical programming guide for a linear TV service (e.g., Fios®, Comcast®, DirectTVNOW®, etc.) subscribed to by the user on whose broadcasted content the recording has been performed. Typically, such linear TV services or multichannel video program distributors (MVDPs) provide a programming guide of EPG 122 in advance. The programming guide of EPG 122 may have the form of a grid, table, array, list, or other form, that indicates content that will be broadcasted in various channels for a period of time (e.g., days, weeks) which can be accumulated and stored in a database. In an embodiment, EPG 122 is a menu-based system that provides users with continuously updated menus displaying broadcast programming or scheduling information for current and upcoming programming Over a period of time, this accumulated data becomes the historical programming guide which contains broadcast information for channels for the previous number of days collected. Furthermore, EPG 122 may be periodically-updated or intermittently-updated and may be published by a variety of different media broadcasting entities, such as DirectTV®, AT&T®, Comcast®, or the like.

In embodiments, EPG 122 may be extracted based on the user's subscription and used to aid in the identification of recorded items of media content. For instance, the programming guide of EPG 122 may include additional metadata (e.g., air times, channels, etc.) or links to external database(s) to use to obtain supplemental information to identify recorded items. Multiple airing instances of a same particular item of media content (e.g., a TV show, a movie, etc.) may be indicated at different times/days and/or different channels in EPG 122. The additional metadata of EPG 122 may supplement the listed information retrieved from DVR 102 to clearly identify the recorded item. In embodiments, EPG 122 may be accessed by via network (e.g., the Internet) or some other communication channel.

Network 112 may comprise one or more networks such as local area networks (LANs), wide area networks (WANs), enterprise networks, the Internet, etc., and may include one or more of wired and/or wireless communication links.

Server 114 may be a server or a collection of servers accessible by switching device 108 over network 112 (e.g., "network-based" or "cloud-based" servers in an embodiment) to store, manage, and process data. Media content metadata enhancing system 124 of server 114 is configured to communicate with switching device 108 to retrieve and enhance metadata of a recorded item of media content stored on DVR 102, such as recorded item 120. In embodiments, and discussed in greater detail hereinafter, media content metadata enhancing system 124 relies on EPG 122 and content database 126 to identify the recorded item and enhance the associated metadata, respectively.

Content database 126 may be stored in one or more suitable memory devices and may be configured to store rich metadata (e.g., comprehensive information) of items of media content. In embodiments, the rich metadata may include images, OTT (over the top) links, external site links, social networking handles, or the like. Content database 126 may be populated with the rich metadata in various ways. For instance, content database 126 may be populated by obtaining metadata about items of media content from different content providers such as entertainment content metadata provider(s) (e.g., Gracenote®, Rovi®, etc.), video content provider(s) (e.g., Hulu®, Netflix®, HBO®, YouTube®, Amazon®, etc.), web-based information provider(s) (e.g., IMDB®), audio content provider(s) (e.g., Rhapshody®, iTunes®, Last.Fm®, etc.), recorded content, or network-based content.

Content database 126 may be further populated by obtaining metadata from different source websites, such as source website 118. Source website 118 may comprise one or more websites that are published by providers of media content (e.g., Netflix®, Hulu®, Amazon®, HBOGO®, etc.), as well as providers that provide data regarding media content, and/or that collect data regarding media content from users, businesses, etc., such a chat board website, a news website, a blog website, a social network such as Facebook®, an online digital media store (e.g., iTunes®, etc.), etc. In some embodiments, media content metadata enhancing system 124 crawls one or more websites, such as source website 118, to obtain additional metadata associated with items of media content to be stored in content database 126. Additionally, and in embodiments, content database 126 may be populated by obtaining EPG 122 from set top box 104 or by obtaining metadata about items of media content from set top box 104, source website 118 and/or DVR 102.

As noted above, in embodiments, media content metadata enhancing system 124 is configured to retrieve metadata associated with a recorded item of media content (recorded by a user), identify the aired instance of the recorded item, retrieve further metadata associated with the recorded item, and to aggregate and store the metadata in an end user database associated with the end user. In this manner, when the user accesses the recorded item on the DVR (or elsewhere), the aggregated metadata may be presented to the user to provide information regarding the recorded item beyond what the DVR conventionally maintains. Examples of such information include blog, chat board, news site and/or social media commentary about the recorded item.

With reference to FIG. 1, media content metadata merger 124 is configured to retrieve first metadata associated with recorded item 120 from DVR 102, utilize EPG 122 to identify an aired instance of recorded item 120, retrieve second metadata associated with recorded item 120 from content database 126, and store the first metadata and the second metadata in end user database 128.

End user database 128 is stored in one or more suitable storage devices and is configured to store enhanced metadata associated with a recorded item of media content. In embodiments, end user database 128 is searchable by the end user to identify and access the first metadata and second metadata for display to the end user via the end user device and/or the recorded item of media content for playback via the end user device. For instance, end user database 128 stores a content ID for each recorded item of media content that can be used to access such item of media content from a content provider website or service for playback. Thus, for example, when an end user wishes to watch a recorded item of media content, the content ID can be retrieved from end user database 128 and passed to the content provider website or service to quickly retrieve the content. In the embodiment shown in FIG. 1, end user database 128 is configured to maintain metadata relating to recorded item 120 where the additional metadata is retrieved from content database 126 via various sources.

Furthermore, and in embodiments, media content metadata enhancing system 124 enables the use of the first metadata and the second metadata to aid in user modeling for searching and recommending items of media content. In embodiments, end users are enabled to search for media content including recorded items of media content based on enhanced metadata about such recorded items of media content that are stored by media content search system 124. This enhanced metadata may also be provided to the user for viewing thereof, e.g., via switching device 108 on a display that is connected thereto. Such enhanced metadata about recorded items of media content, discussed in detail elsewhere herein, may be obtained by performing a merging process between first metadata of recorded items of media content and second metadata retrieved from database 126. Furthermore, and as noted above, the end user may simply search end user database 128 to identify and access the enhanced metadata for display to the end user and/or the recorded item of media content for playback via switching device 108.

In embodiments, search queries submitted by the end user are passed by switching device 108 to media content metadata enhancing system 124 and enhanced metadata about recorded items of media content that are responsive to the search query are passed back to switching device 108 for display via the connected display device. If the end user identifies and selects one of the recorded items of media content, switching device 108 can utilize a content ID and/or other information provided by or otherwise accessible to media content metadata enhancing system 124 to access recorded items of media content for display or playback to the end user via the connected display device. These features of system 100 are discussed in more detail elsewhere herein.

Figure 2:
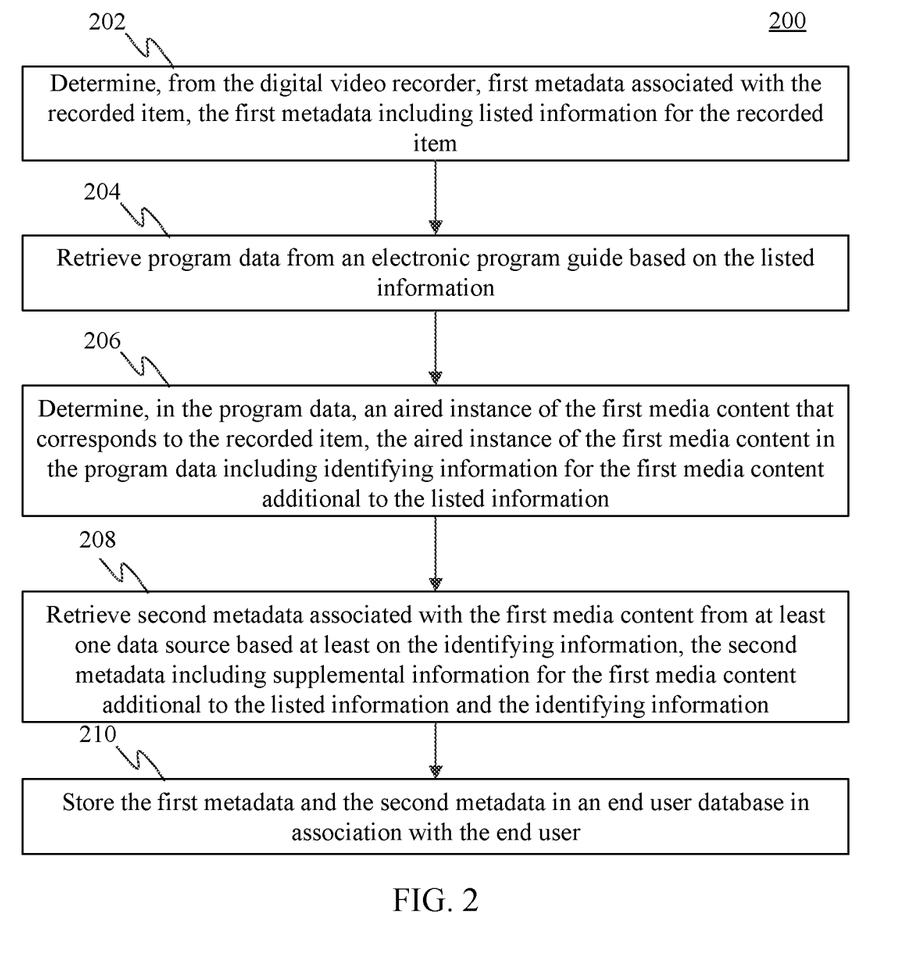
FIG. 2 depicts a flowchart for enhancing metadata for recorded items of media content, according to an embodiment.
Figure 3:
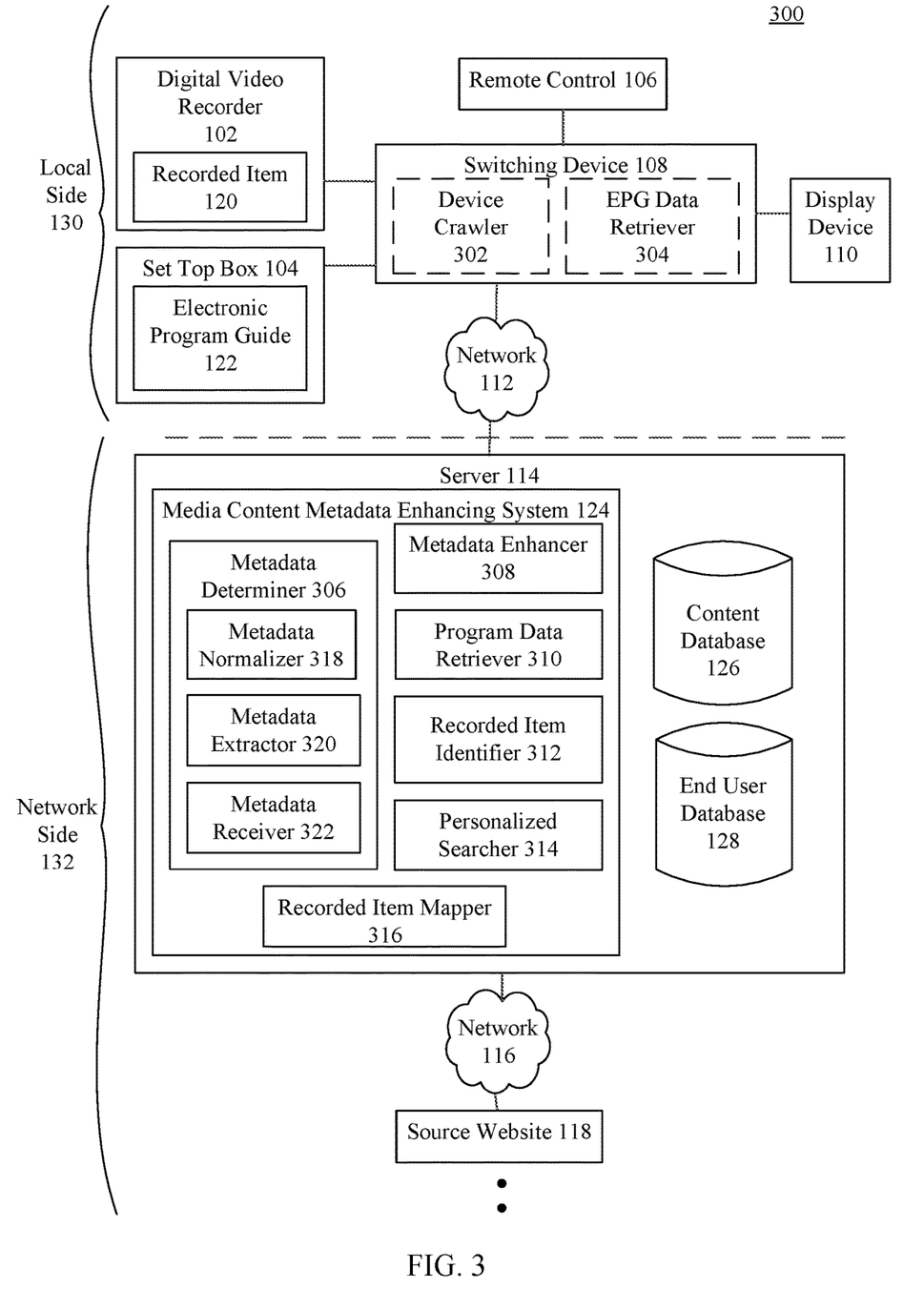
FIG. 3 depicts a further detailed block diagram of the system of FIG. 1, according to an embodiment.

In embodiments, media content metadata enhancing system 124 may be configured in various ways. For example, FIG. 2 depicts a flowchart 200 for enhancing metadata for recorded items of media content, according to an embodiment. Media content metadata enhancing system 124 of FIG. 1 may operate according to flowchart 200, in an embodiment. For purposes of illustration, flowchart 200 is described with respect to FIG. 3. FIG. 3 depicts a further detailed block diagram of a media system 300, which is an example of system 100 of FIG. 1, according to an embodiment.

As shown in FIG. 3, local side 130 includes DVR 102, set top box 104, remote control 106, switching device 108, display device 110 and network 112. Network side 132 includes server 114, media content metadata enhancing system 124, content database 126, end user database 128, source website 118, and network 116. These elements are configured to operate in a substantially similar manner as those described with respect to FIG. 1. Furthermore, and as shown in FIG. 3, switching device 108 includes a device crawler 302 and an EPG data retriever 304. Media content metadata enhancing system 124 includes a metadata determiner 306, a metadata enhancer 308, a program data retriever 310, a recorded item identifier 312, a personalized searcher 314, and a recorded item mapper 316. Metadata determiner 306 includes a metadata normalizer 318, a metadata extractor 320, and a metadata receiver 322. These features of system 300 are described as follows in conjunction with flowchart 200.

Note that not all steps of flowchart 200 need to be performed in all embodiments. Further structural and operational embodiments will be apparent to persons skilled in the relevant art(s) based on the following description.

Flowchart 200 begins with step 202. In step 202, first metadata associated with the recorded item is determined from the digital video recorder, where the first metadata includes listed information for the recorded item. For example, with reference to FIG. 3, metadata determiner 306 determines, from DVR 102, first metadata associated with recorded item 120 that includes listed information for recorded item 120. As noted above, the listed information may include high level information for the recorded item that is maintained in association with the recorded item on DVR 102, such as the title of the recorded item, the channel the recorded item was recorded from or the date the recorded item was recorded. For example, in one illustrative example, the listed information may include a title of "Star Wars," a recorded channel of "FX," a recorded date of "1-2-2019," and a recorded time of "3:00 pm EST."

In step 204, program data is retrieved from an electronic program guide based on the listed information. For example, with reference to FIG. 3, program data retriever 130 retrieves program data from EPG 122 based on the listed information. Following the above example, program data retriever 130 may retrieve program data from EPG 122 for the recorded item identified by metadata that includes title of "Star Wars," a recorded channel of "FX," a recorded date of "1-2-2019," and "a recorded time of 3:00 pm EST." This particular metadata includes that the recorded item aired on channel FX on the day of 1-2-19. The program listings of EPG 122 may be searched for the date of Jan. 2, 2019, on channel FX, to determine any program airings of media content with "Star Wars" in the title. Numerous airings of such media content may be obtained for channel FX on Jan. 2, 2019, including "Star Wars" at 1 pm EST, "Star Wars: A New Hope" at 10 am EST, "Star Wars: The Last Jedi" at 5 pm EST, "Star Wars: Episode V" at 3:00 pm EST, etc.

In step 206, an aired instance of the first media content that corresponds to the recorded item is determined in the program data, where the aired instance of the first media content in the program data includes identifying information for the first media content additional to the listed information. In an embodiment, recorded item identifier 312 filters the program data retrieved from EPG 122 to identify the aired instance of the first media content that corresponds to the recorded item. For example, with reference to FIG. 3, recorded item identifier 312 determines in the program data an aired instance of the first media content that corresponds to recorded item 120. In embodiments, the aired instance of the first media content includes identifying information, such as the airing year, for the first media content, and at least of this identifying information is additional to the listed information (from the DVR), but may also include information that overlaps the listed information. For example, following the above example, recorded item identifier 312 determines an instance of recorded item 120 "Star Wars" aired at "3 P.M. EST." In embodiments, and as noted above, the aired instance of the first media content includes identifying information for the first media content additional to the listed information. For example, following the above example, the aired instance of "Star Wars" and "3:0 pm EST" further includes additional information to identify the title as "Star Wars: Episode V."

Note that in this example, if multiple airings occurred at 3 pm EST matching "Star Wars" on Jan. 2, 2019, on the FX channel, recorded item identifier 312 determines which is a best match to the metadata determined by metadata determiner 306. For example, if metadata determiner 306 determined a program length for the recorded item as metadata, recorded item identifier 312 may compare this determined program length to the indicated program lengths for the multiple airings, as indicated in EPG 122 for a closest match. The closest matching airing is indicated by recorded item identifier 312 at the determined airing (in step 206).

In step 208, second metadata associated with the first media content is retrieved from at least one data source based at least on the identifying information, where the second metadata includes supplemental information for the first media content additional to the listed information and the identifying information. For example, with reference to FIG. 3, metadata enhancer 308 retrieves second metadata associated with the first media content from content database 126 based at least on the identifying information. For example, following the above example, metadata enhancer 308 retrieves second metadata for "Star Wars: Episode V" from content database 126. In embodiments, and as noted above, the second metadata includes supplemental information for the first media content additional to the listed information and the identifying information. The supplemental information may include information describing the recorded item that is the same or additional to the listed information and the identifying information. For example, following the above example, the second metadata may include supplemental information to further identify the recorded item by, such as a title of "Star Wars: Episode V, The Empire Strikes Back," a release date of "1980" and story by "George Lucas."

In step 210, the first metadata and the second metadata are stored in an end user database in association with the end user. For example, with reference to FIG. 3, metadata enhancer 308 stores the first metadata and the second metadata in end user database 128 in association with the end user. In embodiments, the metadata is stored in end user database 128 along with a content identifier (ID) corresponding to recorded item 120. For example, following the above example, "Star Wars: Episode V, The Empire Strikes Back," "1980" and "George Lucas," "FX," "1-2-2019," and "3:00 pm EST" are all stored in end user database 128 in association with the end user of DVR 102 and switching device 108. In this way, the content ID corresponding to recorded item 120 enables the end user to access and play back recorded item 120 on a TV or other device and be provided with the enhanced metadata obtained by metadata enhancer 308.

As noted above, media content metadata enhancing system 124 is configured to enable the end user to perform a targeted search for media content within end user database 128. For example, and with reference to FIG. 3, personalized searcher 314 is configured to enable an end user of DVR 102 and switching device 108 to perform a targeted search for media content within end user database 128 corresponding to the user (e.g., by a user identifier associated with the user and end user database 128 for the user). For instance, personalized searcher 314 is configured to receive a search query from the end user via switching device 108. In response to the search request, personalized searcher 314 may apply the search query to end user database 126 to identify items of media content, including recorded items of media content, based at least on the aforementioned metadata stored in end user database 128. In an embodiment, personalized searcher 314 is further configured to provide the metadata associated with the recorded item of media content, or a portion thereof, to switching device 108 for presentation to the end user, for instance via display device 110. In another embodiment, personalized searcher 314 is configured to enable the playback of the recorded item of media content via switching device 108. As such, personalized searcher 314 is configured to enable end users of switching device 108 to perform targeted searches for items of media content, including recorded items of media content, within end user database 128. Personalized searcher 314 further enables personalized searching by different kinds of categories, such as "story by."

Furthermore, and as noted above, media content metadata enhancing system 124 is configured to enable the end user to receive recommendations for media content based on content stored in end user database 128. For example, and with reference to FIG. 3, personalized searcher 314 is configured to enable an end user of DVR 102 and switching device 108 to request recommendations for media content within corresponding end user database 128. Alternatively, personalized searcher 314 is configured to automatically transmit recommendations of items of media content to an end user of DVR 102 and switching device 108. In an embodiment, personalized searcher 314 is configured to enable the playback of a recommended recorded item of media content via switching device 108. As such, personalized searcher 314 is configured to enable end users of switching device 108 to receive recommendations of items of media content in various ways based on content stored in end user database 128. For instance, the recommendations may be based on content with similar directors, actors, year, or the like to content stored in end user database 128.

Figure 4:
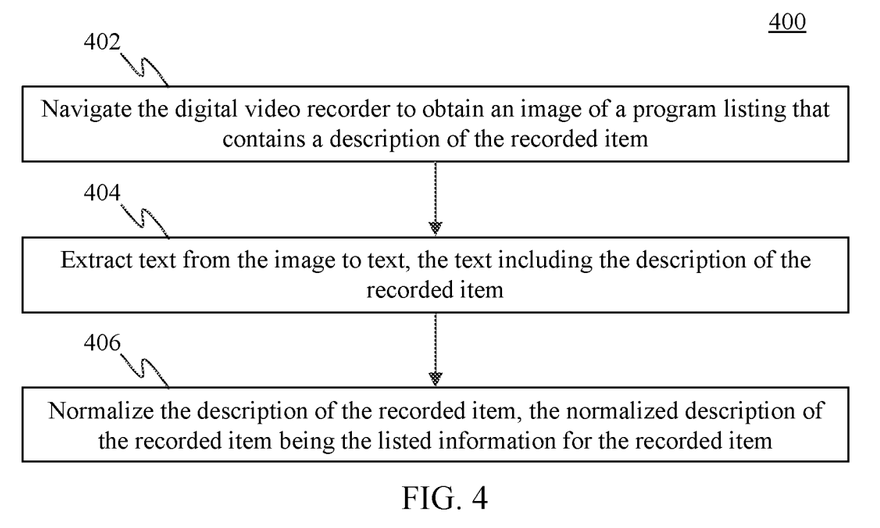
FIG. 4 depicts a flowchart for determining metadata associated with the recorded item in a DVR, according to an embodiment.

As described above, first metadata associated with the recorded item is determined from the digital video recorder in various ways. For instance, FIG. 4 depicts a flowchart 400 for determining first metadata associated with the recorded item, according to an embodiment. In an embodiment, flowchart 400 may be implemented by metadata determiner 306. In an embodiment, flowchart 400 may be performed as part of step 202 of flowchart 200. FIG. 4 is described as follows with continued reference to system 100 and system 300. Other structural and operational embodiments will be apparent to persons skilled in the relevant art(s) based on the following discussion regarding flowchart 400, system 100 and system 300.

FIG. 4 begins with step 402. In step 402, the digital video recorder is navigated to obtain an image of a program listing that contains a description of the recorded item. For example, with reference to FIG. 3, DVR 102 is navigated to obtain an image of a program listing that contains a description of recorded item 120. The image is provided to metadata extractor 320 for processing. Note that in an embodiment, metadata extractor 318 may receive the metadata in the form of textual data from the DVR (e.g., by requesting a listing of items recorded on the DVR through switching device 108). In another embodiment, device crawler 302 may be configured to navigate, or "crawl," the menus of the DVR to obtain the metadata, and may provide the metadata to metadata extractor 318

In an embodiment navigation/crawl embodiment, metadata extractor 318 may know the menu configuration of DVR 102. Thus, metadata extractor 318 may transmit instructions to device crawler 302 to navigate from a home menu of DVR 102 to a "stored" menu, where one or more images are captured of the listings of recorded items stored on DVR 102. For example, device crawler 302 may select the on-screen navigation buttons (e.g., by foreknowledge of identifiers for the buttons, of the on-screen locations of the buttons etc.) by transmitting the selection commands to DVR 102, and navigating from a home screen to the page of stored recorded items. Then, device crawler 302 performs screen captures of the page listing the stored recorded items, scrolling the page as needed, to capture images of the entire listing. For example, switching device 108 may include a camera controlled by device crawler 302 to perform a literal screen image capture of display device 110 when displaying the listing. Alternatively, device crawler 302 commands DVR 102 to transmit back screen display data when the listing is displayed. Note that in an embodiment, this image capturing of the listing of recorded items may be performed at a time media system 100 is not being used by a user to view content (e.g., at nighttime, etc.) so that the navigating of menus of DVR 102 to obtain the listing does not interfere with the user's content viewing.

In step 404, text is extracted from the image to text, where the text includes the description of the recorded item. For example, with reference to FIG. 3, metadata extractor 320 extracts text from the image, where the text includes the description of recorded item 120 that was included in the program listings on DVR 102. In embodiments, metadata extractor 320 parses the image to determine which portions of the image comprise text and which kinds of text the portions comprise. Following the above example, metadata extractor 318 extracts the text "Stor War8," "FX channel," and "1-2-2019" from the image. Note that the image may have any suitable format, including being a file format such as .gif., .jpg, .mpeg, etc. Any suitable type of optical character recognition (OCR) may be performed to extract text from the recorded item listing images.

In step 406, the description of the recorded item is normalized, the normalized description of the recorded item being the listed information for the recorded item. For example, with reference to FIG. 3, metadata normalizer 318 optionally normalizes the description of recorded item 120. The normalized description of recorded item 120 results in the listed information for recorded item 120. Following the above example, metadata extractor 318 normalizes the text to "Star Wars," "FX", and "1-2-2019" by correcting misspellings, eliminating unneeded words, etc.

In embodiments, metadata determiner 306 may determine the first metadata via an Application Programming Interface (API) connection. For example, and with reference to FIG. 3, metadata receiver 322 receives the first metadata via an API connection with DVR 102 or switching device 108.

Figure 5:
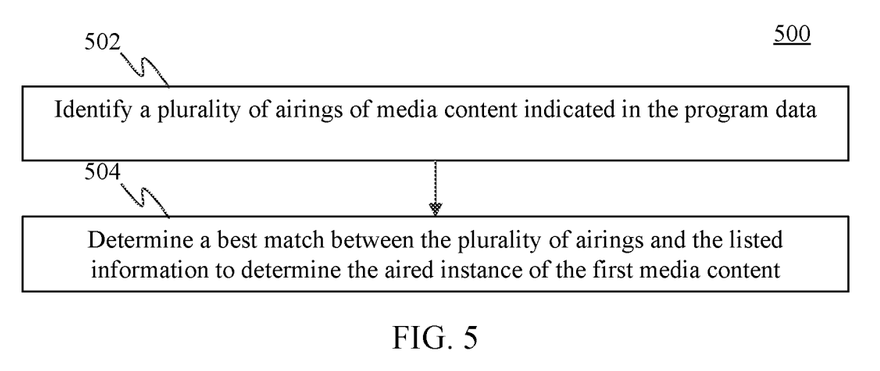
FIG. 5 depicts a flowchart for determining an aired instance of the first media content that corresponds to the recorded item, according to an embodiment.

As described above, program data retriever 310 determines the aired instance of the first media content. Program data retriever 310 may be configured to do so in various ways. For instance, FIG. 5 depicts a flowchart 500 for determining the aired instance of the first media content that corresponds to the recorded item, according to an embodiment. In an embodiment, flowchart 500 may be implemented by program data retriever 310. In an embodiment, flowchart 500 may be performed as part of step 206 of flowchart 200. FIG. 5 is described as follows with continued reference to system 100 and system 300. Other structural and operational embodiments will be apparent to persons skilled in the relevant art(s) based on the following discussion regarding flowchart 500, system 100 and system 300.

FIG. 5 begins with step 502. In step 502, a plurality of airings of media content indicated in the program data are identified. For example, with reference to FIG. 3, program data retriever 310 identifies a plurality of airings of media content indicated in the program data. In one illustrative example, program data retriever 310 identifies an airing with a title of "Star Wars" on "FX" on "1-2-19" and three airings with a title of "Storage Wars" on "A&E" on "1-2-19."

In step 504, a best match is determined between the plurality of airings and the listed information to determine the aired instance of the first media content. For example, in an embodiment, program data retriever 310 determines a best match between the plurality of airings and the listed information to determine the aired instance of the first media content. Following the above example, program data retriever 310 determines that the airing of "Star Wars" on "FX" on "1-2-19" is the best match for recorded item 120.

In embodiments, program data retriever 310 may determine the best match in various ways. For instance, in an embodiment, program data retriever 310 may perform a string match between the plurality of airings and the listed information to identify an airing of the plurality of airings that matches a greatest number of a recorded channel of the recorded item. Alternatively, or additionally, in an embodiment, program data retriever 310 may perform a string match between the plurality of airings and the listed information to identify an airing of the plurality of airings that matches the greatest number of a date upon which the recorded item was recorded, a recording time of the recorded item, a title of the recorded item, a title of the episode of the recorded item, a recording duration of the recorded item, and/or any other associated data.

Furthermore, program data retriever 310 may determine the best match by filtering the airings. In an embodiment, the airings may be filtered based on recording channel information, if available. In another embodiment, the airings may be filtered based on recording time and recording duration. For instance, all the airings falling in and around the time interval of the recording start time to the recording end time is considered. Alternatively, or additionally, the airing with the largest interval match is chosen.

As noted above, in embodiments, once second metadata is retrieved, metadata enhancer stores the first metadata and the second metadata in an end user database in association with the end user. For instance, and as noted above, metadata enhancer 308 of FIG. 3 stores the first metadata and the second metadata in content database 126. Metadata enhancer 308 may perform this storing in various ways.

Figure 6:
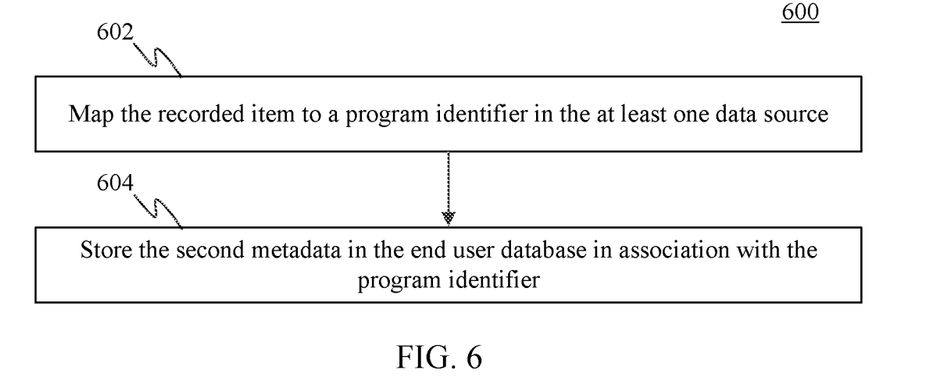
FIG. 6 depicts a flowchart for storing metadata in an end user database, according to an embodiment.

For instance, FIG. 6 shows a flowchart 600 for storing metadata in an end user database, according to an embodiment. In an embodiment, flowchart 600 may be implemented by metadata enhancer 308. In an embodiment, flowchart 600 may be performed as part of step 210 of flowchart 200. FIG. 6 is described as follows with continued reference to system 100 and system 300. Other structural and operational embodiments will be apparent to persons skilled in the relevant art(s) based on the following discussion regarding flowchart 600 and FIG. 3.

Flowchart 600 begins with step 602. In step 602, the recorded item is mapped to a program identifier in the at least one data source. For example, with reference to FIG. 3, metadata enhancer 308 maps the recorded item to a program identifier in content database 126. Following the above example, metadata enhancer 308 maps recorded item 120 "Star Wars: Episode V" to a program identifier (e.g., a numeric code, an alphanumeric code, a hash value, etc.) in content database 126 corresponding to "Star Wars: Episode V, The Empire Strikes Back." In embodiments, the mapping may be performed in response to various determinations.

For instance, in embodiments, the recorded item may be mapped to a program identifier in the at least one data source in response to a determination of at least a partial match between a title of the recorded item and a title associated with the program identifier, a match between a recording duration of the recorded item and a recording duration associated with the program identifier, a match between an episode title of the recorded item in the first metadata and an episode title associated with the program identifier, a match between a cast and crew of the recorded item and a crew and cast associated with the program identifier, etc. In any event, by mapping the recorded item to a program identifier in the at least one data source, a recorded item in a DVR is mapped to a generic database, creating not only a better user interface for the end user but also providing enhanced data to use for better personalization.

In step 604, the second metadata is stored in the end user database in association with the program identifier. For example, and with reference to FIG. 3, metadata enhancer 308 stores the second metadata in end user database 128 in association with program identifier. Following the above example, metadata enhancer 308 stores "Star Wars: Episode V, The Empire Strikes Back," a release date of "1980" and story by "George Lucas" in end user database 128 in association with the program identifier.

Figure 7:
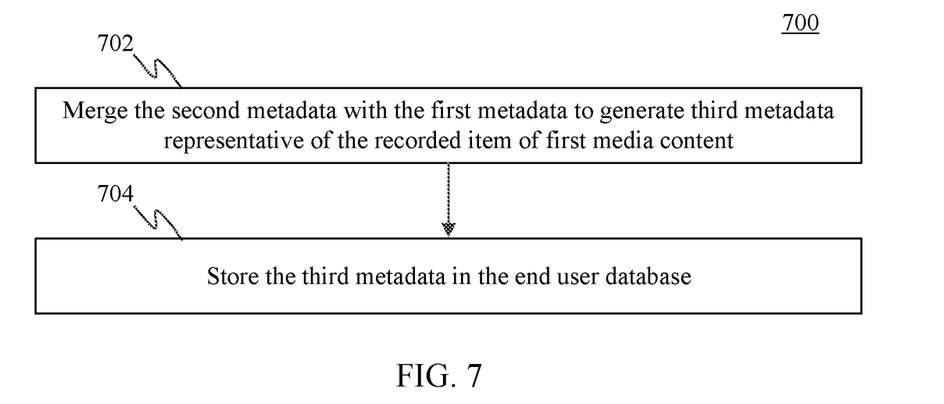
FIG. 7 depicts another flowchart for storing metadata in an end user database, according to an embodiment.

As noted above, metadata enhancer 308 stores the first metadata and the second metadata in the end user database. In embodiments, the second metadata may achieve such storing in various ways. For instance, FIG. 7 depicts a flowchart 700 for storing metadata in an end user database, according to an embodiment. In an embodiment, flowchart 700 may be implemented by metadata enhancer 308. In an embodiment, flowchart 700 may be performed as part of step 604 of flowchart 600. FIG. 7 is described as follows with continued reference to system 100 and system 300. Other structural and operational embodiments will be apparent to persons skilled in the relevant art(s) based on the following discussion regarding flowchart 700 and FIG. 3.

Flowchart 700 begins with step 702. In step 702, the second metadata is merged with the first metadata to generate third metadata representative of the recorded item of first media content. For example, with reference to FIG. 3, metadata enhancer 308 mergers the second metadata with the first metadata to generate third metadata for storing in end user database 128. For instance, and following the above example, metadata enhancer 308 merges "Star Wars: Episode V, The Empire Strikes Back," "1980" and "George Lucas," with "Star Wars," "FX," "1-2-2019" and "3:00 pm EST" to generate "Star Wars: Episode V, The Empire Strikes Back," "1980" and "George Lucas," "FX," and "1-2-2019." Note that as described above, any type of further metadata may be included in second metadata (and merged into third metadata) obtained from one or more source websites 118, including new information, blog information, social media commentary, etc.

In step 704, the third metadata is stored in the end user database. For example, with reference to FIG. 3, metadata enhancer 308 stores the third metadata in end user database 128. For instance, and following the above example, metadata enhancer stores "Star Wars: Episode V, The Empire Strikes Back," "1980" and "George Lucas," "FX," "1-2-2019," and "3:00 pm EST" in end user database 128. In this way, the third metadata will be accessible for "Star Wars" and the end user's account for searching, user modeling, etc. The third metadata will also be accessible for display to the end user.

In embodiments, switching device 108 is configured to obtain the first metadata and the EPG data for transmission to media content metadata enhancing system 124. For instance, with respect to FIG. 3, switching device 108 is configured to receive first metadata of recorded item 120 from DVR 102 associated with an end user. In embodiments, DVR 102 may be internal or external to switching device 108 associated with the end user. For example, and with reference to FIG. 3, switching device 108 may receive metadata of recorded item 120 from DVR 102. In embodiments, the recorded item may be a movie, a television show, an episode of a television show. However, this is not to be construed in a limiting sense and the recorded item of media content may also encompass audio content (e.g., albums, songs, podcasts), video games, software applications or any other type of recordable media content.

III. Example Computer System Implementation

DVR 102, set top box 104, remote control 106, switching device 108, display device 110, server 114, media content metadata enhancing system 124, content database 126, end user database 128, and source website 118 shown in FIG. 1, device crawler 302, EPG data retriever 304, metadata normalizer 318, metadata extractor 320, metadata receiver 322, recorded item mapper 316, metadata enhancer 308, program data retriever 310, recorded item identifier 312, personalized searcher 314 shown in FIG. 3, flowchart 200, flowchart 400, flowchart 500, flowchart 600, and flowchart 700 may be implemented in hardware, or any combination of hardware with software and/or firmware. For example, the computing devices of FIGS. 1 and 3 and/or the components included therein may be implemented as computer program code configured to be executed in one or more processors. In another example, DVR 102, set top box 104, remote control 106, switching device 108, display device 110, server 114, media content metadata enhancing system 124, content database 126, end user database 128, and source website 118 shown in FIG. 1, device crawler 302, EPG data retriever 304, metadata normalizer 318, metadata extractor 320, metadata receiver 322, recorded item mapper 316, metadata enhancer 308, program data retriever 310, recorded item identifier 312, personalized searcher 314 shown in FIG. 3 and/or the components included therein may be implemented as hardware (e.g., hardware logic/electrical circuitry), or any combination of hardware with one or both of software (computer program code configured to be executed in one or more processors or processing devices) and firmware.

Figure 8:
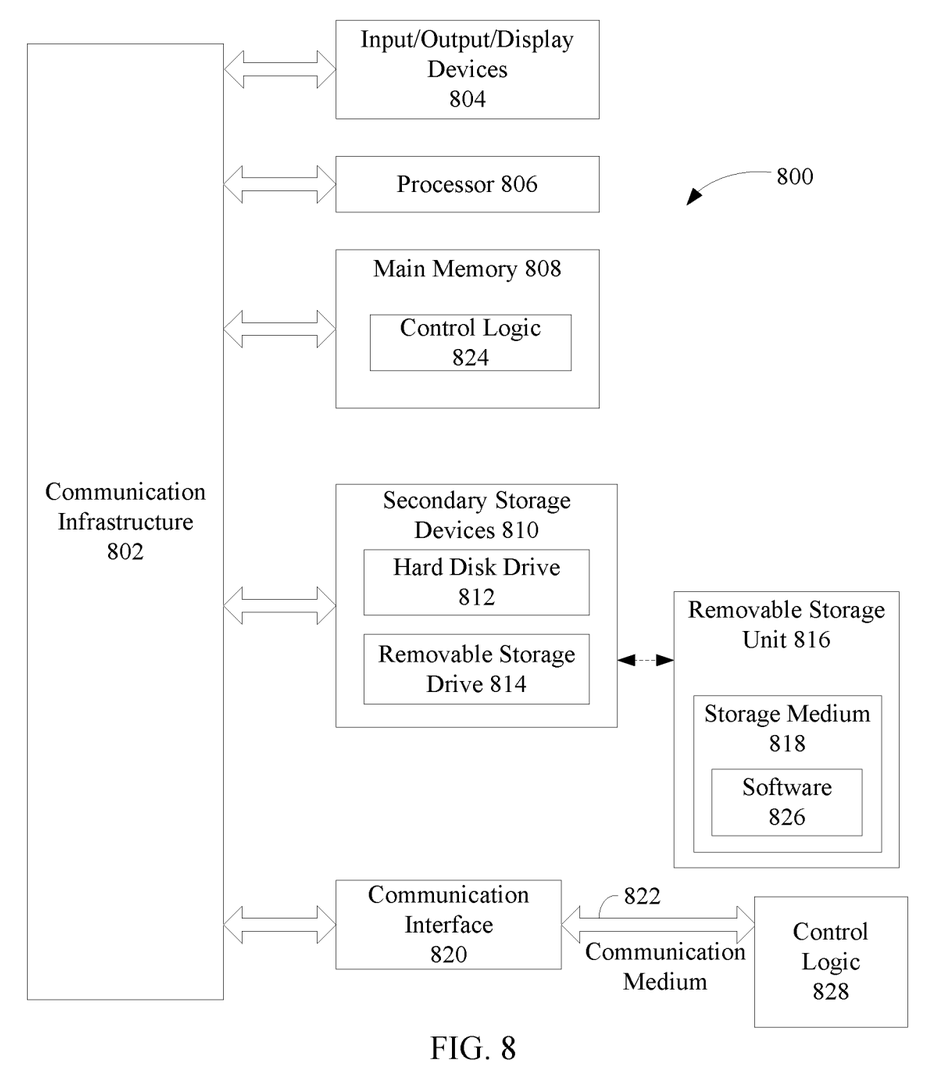
FIG. 8 is a block diagram of an example computer system in which embodiments may be implemented.

The embodiments described herein, including systems, methods/processes, and/or apparatuses, may be implemented using well known servers/computers, such as computer 800 shown in FIG. 8. For example, DVR 102, set top box 104, remote control 106, switching device 108, display device 110, server 114, media content metadata enhancing system 124, content database 126, end user database 128, and source website 118 shown in FIG. 1, device crawler 302, EPG data retriever 304, metadata extractor 318, metadata receiver 320, recorded item mapper 316, metadata enhancer 308, program data retriever 310, recorded item identifier 312, personalized searcher 314 shown in FIG. 1 and FIG. 3 and/or the components included therein, and each of the steps of flowchart 200 depicted in FIG. 2, flowchart 300 depicted in FIG. 3, flowchart 400 depicted in FIG. 4, flowchart 500 depicted in FIG. 5, flowchart 600 depicted in FIG. 6, and flowchart 700 depicted in FIG. 7 can each be implemented using one or more computers 800.

Computer 800 can be any commercially available and well-known computer capable of performing the functions described herein, such as computers available from International Business Machines, Apple, Sun, HP, Dell, Cray, etc. Computer 800 may be any type of computer, including a desktop computer, a server, etc.

As shown in FIG. 8, computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads.

Computer 800 also includes a primary or main memory 808, such as random access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disc (CD), digital versatile disc (DVD), Blu-Ray™ disc, optical storage disk, memory stick, memory card, or any other computer data storage device. Removable storage drive 814 reads from and/or writes to removable storage unit 816 in a well-known manner.

Computer 800 also includes input/output/display devices 804, such as monitors, keyboards, pointing devices, etc.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as local area networks (LANs), wide area networks (WANs), the Internet, etc. Network interface 820 may interface with remote sites or networks via wired or wireless connections. Examples of communication interface 822 include but are not limited to a modem, a network interface card (e.g., an Ethernet card), a communication port, a Personal Computer Memory Card International Association (PCMCIA) card, etc.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing the DVR 102, set top box 104, remote control 106, switching device 108, display device 110, server 114, media content metadata enhancing system 124, content database 126, end user database 128, and source website 118 shown in FIG. 1, device crawler 302, EPG data retriever 304, metadata normalizer 318, metadata extractor 320, metadata receiver 322, recorded item mapper 316, metadata enhancer 308, program data retriever 310, recorded item identifier 312, personalized searcher 314 shown in FIG. 3, flowchart 200, flowchart 400, flowchart 500, flowchart 600, and flowchart 700 and/or further embodiments described herein. Embodiments of the invention include embodiments directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 8 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Additional Exemplary Embodiments

A method of enhancing metadata of a recorded item of first media content stored on a digital video recorder associated with an end user is described herein. The method comprises determining, from the digital video recorder, first metadata associated with the recorded item, the first metadata including listed information for the recorded item, retrieving program data from an electronic program guide based on the listed information, determining, in the program data, an aired instance of the first media content that corresponds to the recorded item, the aired instance of the first media content in the program data including identifying information for the first media content additional to the listed information, retrieving second metadata associated with the first media content from at least one data source based at least on the identifying information, the second metadata including supplemental information for the first media content additional to the listed information and the identifying information, and storing the first metadata and the second metadata in an end user database in association with the end user.

In one embodiment of the foregoing method, said determining, from the digital video recorder, first metadata associated with the recorded item comprises navigating the digital video recorder to obtain an image of a program listing that contains a description of the recorded item, extracting text from the image, the text including the description of the recorded item, and normalizing the description of the recorded item, the normalized description of the recorded item being the listed information for the recorded item.

In another embodiment of the foregoing method, said determining the aired instance of the first media content that corresponds to the recorded item comprises identifying a plurality of airings of media content indicated in the program data, and determining a best match between the plurality of airings and the listed information to determine the aired instance of the first media content.

In yet another embodiment of the foregoing method, said determining a best match comprises performing a string match between the plurality of airings and the listed information to identify an airing of the plurality of airings that matches a greatest number of a recorded channel of the recorded item, a date upon which the recorded item was recorded, a recording time of the recorded item, a title of the recorded item, a title of the episode of the recorded item, a recording duration of the recorded item, and a title of the recorded item.

In yet another embodiment of the foregoing method, said storing comprises mapping the recorded item to a program identifier in the at least one data source, and storing the second metadata in the end user database in association with the program identifier.

In yet another embodiment of the foregoing method, said mapping the recorded item to the program identifier in the at least one data source is performed in response to a determination of at least a partial match between a title of the recorded item and a title of the program identifier, a determination of a match between a recording time of the recorded item and a recording time of the program identifier, a determination of a match between a recording duration of the recorded item and a recording duration of the program identifier, a determination of a match between an episode title of the recorded item in the first metadata and an episode title of the program identifier, or a determination of a match between a cast and crew of the recorded item and a crew and cast of the program identifier.

In yet another embodiment of the foregoing method, said storing comprises merging the second metadata with the first metadata to generate third metadata representative of the recorded item of first media content, and storing the third metadata in the end user database.

In yet another embodiment of the foregoing method, the end user database is searchable by the end user to identify and access at least one of the second metadata for display at a display screen via a switch associated with the end user, or the recorded item for playback via the switch.

A system is described herein that includes one or more processors, and one or more memory devices connected to the one or more processors, the one or more memory devices storing program code for execution by the one or more processors, the program code including a metadata determiner configured to determine, from a digital video recorder associated with an end user, first metadata associated with a recorded item of first media content stored on the digital video recorder and including listed information for the recorded item, a program data retriever configured to retrieve program data from an electronic program guide based on the listed information, a recorded item identifier configured to determine, in the program data, an aired instance of the first media content that corresponds to the recorded item, the aired instance of the first media content in the program data including identifying information for the first media content additional to the listed information, and a metadata enhancer configured to retrieve second metadata associated with the first media content from at least one data source based at least on the identifying information, the second metadata including supplemental information for the first media content additional to the listed information and the identifying information, and store the first metadata and the second metadata in an end user database in association with the end user.

In one embodiment of the foregoing system, the metadata determiner comprises a metadata extractor configured to navigate the digital video recorder to obtain an image of a program listing that contains a description of the recorded item, and extract text from the image, the text including the description of the recorded item, and a metadata normalizer configured to normalize the description of the recorded item, the normalized description of the recorded item being the listed information for the recorded item.

In another embodiment of the foregoing system, the program data retriever is further configured to identify a plurality of airings of media content indicated in the program data, and determine a best match between the plurality of airings and the listed information to determine the aired instance of the first media content.

In yet another embodiment of the foregoing system, the program data retriever determines a best match by performing a string match between the plurality of airings and the listed information to identify an airing of the plurality of airings that matches a greatest number of a recorded channel of the recorded item, a date upon which the recorded item was recorded, a recording time of the recorded item, a title of the recorded item, a title of the episode of the recorded item, a recording duration of the recorded item, and a title of the recorded item.

In yet another embodiment of the foregoing system, the program code further comprises a recorded item mapper configured to map the recorded item to a program identifier in the at least one data source and store the second metadata in the end user database in association with the program identifier.

In yet another embodiment of the foregoing system, the recorded item mapper is configured to map the recorded item to the program identifier in the at least one data source in response to a determination of at least a partial match between a title of the identified recorded item and a title of the program identifier, a determination of a match between a recording time of the identified recorded item and a recording time of the program identifier, a determination of a match between a recording duration of the identified recorded item and a recording duration of the program identifier, a determination of a match between an episode title of the identified recorded item in the first metadata and an episode title of the program identifier, or a determination of a match between a cast and crew of the identified recorded item and a crew and cast of the program identifier.

In yet another embodiment of the foregoing system, the metadata enhancer is further configured to merge the second metadata with the first metadata to generate third metadata representative of the recorded item of first media content and store the third metadata in the end user database.

In yet another embodiment of the foregoing system, a personalized searcher configured to enable the end user to identify and access at least one of the second metadata for display at a display screen via a switch associated with the end user, or the recorded item for playback via the switch.

A computer-readable medium having program code recorded thereon that when executed by at least one processor causes the at least one processor to perform a method is described herein. The method comprises determining, from the digital video recorder associated with an end user, first metadata associated with a recorded item of first media content stored on the digital video recorded and including listed information for the recorded item; retrieving program data from an electronic program guide based on the listed information; determining, in the program data, an aired instance of the first media content that corresponds to the recorded item, the aired instance of the first media content in the program data including identifying information for the first media content additional to the listed information; retrieving second metadata associated with the first media content from at least one data source based at least on the identifying information, the second metadata including supplemental information for the first media content additional to the listed information and the identifying information; and storing the first metadata and the second metadata in an end user database in association with the end user.

In one embodiment of the foregoing computer-readable medium, said determining comprises navigating the digital video recorder to obtain an image of a program listing that contains a description of the recorded item; extracting text from the image, the text including the description of the recorded item; and normalizing the description of the recorded item, the normalized description of the recorded item being the listed information for the recorded item.

In another embodiment of the foregoing computer-readable medium, wherein said determining the aired instance of the first media content that corresponds to the recorded item comprises: identifying a plurality of airings of media content indicated in the program data; and determining a best match between the plurality of airings and the listed information to determine the aired instance of the first media content.

In yet another embodiment of the foregoing computer-readable medium, said storing comprises: mapping the recorded item to a program identifier in the at least one data source; and storing the second metadata in the end user database in association with the program identifier.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A method of enhancing metadata of a recorded item of first media content stored on a digital video recorder associated with an end user, comprising:
   determining, from the digital video recorder, first metadata associated with the recorded item, the first metadata including listed information for the recorded item;
   retrieving program data from an electronic program guide based on the listed information, the program data identifying one or more aired instances of the first media content;
   filtering the retrieved program data based on the listed information to identify an aired instance of the first media content that corresponds to the recorded item, the aired instance of the first media content including identifying information for the first media content that is additional to the listed information;
   retrieving second metadata associated with the first media content from at least one data source based at least on the identifying information, the second metadata including supplemental information to further identify the first media content, the supplemental information being additional to the listed information and the identifying information and including information identifying how to access the program data from at least one data source; and
   storing the first metadata and the second metadata in an end user database in association with the end user.

2. The method of claim 1, wherein said determining, from the digital video recorder, first metadata associated with the recorded item comprises:
   navigating the digital video recorder to obtain an image of a program listing that contains a description of the recorded item;
   extracting text from the image, the text including the description of the recorded item; and normalizing the description of the recorded item, the normalized description of the recorded item being the listed information for the recorded item.

3. The method of claim 1, wherein said determining the aired instance of the first media content that corresponds to the recorded item comprises:
identifying a plurality of airings of media content indicated in the program data; and
determining a best match between the plurality of airings and the listed information to determine the aired instance of the first media content.

4. The method of claim 3, wherein said determining a best match comprises:
performing a string match between the plurality of airings and the listed information to identify an airing of the plurality of airings that matches a greatest number of:
a recorded channel of the recorded item;
a date upon which the recorded item was recorded;
a recording time of the recorded item;
a title of the recorded item;
a title of the episode of the recorded item;
a recording duration of the recorded item; and
a title of the recorded item.

5. The method of claim 1, wherein said storing comprises:
mapping the recorded item to a program identifier in the at least one data source; and
storing the second metadata in the end user database in association with the program identifier.

6. The method of claim 5, wherein said mapping the recorded item to the program identifier in the at least one data source is performed in response to:
a determination of at least a partial match between a title of the recorded item and a title of the program identifier;
a determination of a match between a recording time of the recorded item and a recording time of the program identifier;
a determination of a match between a recording duration of the recorded item and a recording duration of the program identifier;
a determination of a match between an episode title of the recorded item in the first metadata and an episode title of the program identifier; or
a determination of a match between a cast and crew of the recorded item and a crew and cast of the program identifier.

7. The method of claim 5, wherein said storing comprises:
merging the second metadata with the first metadata to generate third metadata representative of the recorded item of first media content; and
storing the third metadata in the end user database.

8. The method of claim 1, wherein the end user database is searchable by the end user to identify and access at least one of:
the second metadata for display at a display screen via a switching device associated with the end user; or
the recorded item for playback via the switching device.

9. A system comprising:
one or more processors; and
one or more memory devices connected to the one or more processors, the one or more memory devices storing program code for execution by the one or more processors, the program code including:
a metadata determiner configured to:
determine, from a digital video recorder associated with an end user, first metadata associated with a recorded item of first media content stored on the digital video recorder and including listed information for the recorded item;
a program data retriever configured to:
retrieve program data from an electronic program guide based on the listed information, the program data identifying one or more aired instances of the first media content;
a recorded item identifier configured to:
filter the retrieved program data based on the listed information to identify an aired instance of the first media content that corresponds to the recorded item, the aired instance of the first media content including identifying information for the first media content that is additional to the listed information; and
a metadata enhancer configured to:
retrieve second metadata associated with the first media content from at least one data source based at least on the identifying information, the second metadata including supplemental information to further identify the first media content, the supplemental information being additional to the listed information and the identifying information and including information identifying how to access the program data from at least one data source; and
store the first metadata and the second metadata in an end user database in association with the end user.

10. The system of claim 9, wherein the metadata determiner comprises:
a metadata extractor configured to:
navigate the digital video recorder to obtain an image of a program listing that contains a description of the recorded item; and
extract text from the image, the text including the description of the recorded item; and
a metadata normalizer configured to:
normalize the description of the recorded item, the normalized description of the recorded item being the listed information for the recorded item.

11. The system of claim 9, wherein the program data retriever is further configured to:
identify a plurality of airings of media content indicated in the program data; and
determine a best match between the plurality of airings and the listed information to determine the aired instance of the first media content.

12. The system of claim 11, wherein the program data retriever determines a best match by performing a string match between the plurality of airings and the listed information to identify an airing of the plurality of airings that matches a greatest number of:
a recorded channel of the recorded item;
a date upon which the recorded item was recorded;
a recording time of the recorded item;
a title of the recorded item;
a title of the episode of the recorded item;
a recording duration of the recorded item; and
a title of the recorded item.

13. The system of claim 9, wherein the program code further comprises:
a recorded item mapper configured to:
map the recorded item to a program identifier in the at least one data source; and
store the second metadata in the end user database in association with the program identifier.

14. The system of claim 13, wherein the recorded item mapper is configured to map the recorded item to the program identifier in the at least one data source in response to:
- a determination of at least a partial match between a title of the identified recorded item and a title of the program identifier;
- a determination of a match between a recording time of the identified recorded item and a recording time of the program identifier;
- a determination of a match between a recording duration of the identified recorded item and a recording duration of the program identifier;
- a determination of a match between an episode title of the identified recorded item in the first metadata and an episode title of the program identifier; or
- a determination of a match between a cast and crew of the identified recorded item and a crew and cast of the program identifier.

15. The system of claim 9, wherein the metadata enhancer is further configured to:
- merge the second metadata with the first metadata to generate third metadata representative of the recorded item of first media content; and
- store the third metadata in the end user database.

16. The system of claim 9, further comprising:
- a personalized searcher configured to:
  - enable the end user to identify and access at least one of:
    - the second metadata for display at a display screen via a switching device associated with the end user; or
    - the recorded item for playback via the switching device.

17. A non-transitory computer-readable medium having program code recorded thereon that when executed by at least one processor causes the at least one processor to perform a method, the method comprising:
- determining, from the digital video recorder associated with an end user, first metadata associated with a recorded item of first media content stored on the digital video recorded and including listed information for the recorded item;
- retrieving program data from an electronic program guide based on the listed information, the program data identifying one or more aired instances of the first media content;
- filtering the retrieved program data based on the listed information to identify an aired instance of the first media content that corresponds to the recorded item, the aired instance of the first media content including identifying information for the first media content that is additional to the listed information;
- retrieving second metadata associated with the first media content from at least one data source based at least on the identifying information, the second metadata including supplemental information to further identify the first media content, the supplemental information being additional to the listed information and the identifying information and including information identifying how to access the program data from at least one data source; and
- storing the first metadata and the second metadata in an end user database in association with the end user.

18. The computer-readable medium of claim 17, wherein said determining comprises:
- navigating the digital video recorder to obtain an image of a program listing that contains a description of the recorded item;
- extracting text from the image, the text including the description of the recorded item; and
- normalizing the description of the recorded item, the normalized description of the recorded item being the listed information for the recorded item.

19. The computer-readable medium of claim 17, wherein said determining the aired instance of the first media content that corresponds to the recorded item comprises:
- identifying a plurality of airings of media content indicated in the program data; and
- determining a best match between the plurality of airings and the listed information to determine the aired instance of the first media content.

20. The computer-readable medium of claim 17, wherein said storing comprises:
- mapping the recorded item to a program identifier in the at least one data source; and
- storing the second metadata in the end user database in association with the program identifier.

* * * * *